United States Patent
Aiello et al.

(10) Patent No.: US 8,618,698 B2
(45) Date of Patent: Dec. 31, 2013

(54) SYSTEM AND METHOD FOR CONTROLLING A M2LC SYSTEM

(75) Inventors: Marc Francis Aiello, Oakmont, PA (US); Dustin Matthew Kramer, Fort Collins, CO (US); Kenneth Stephen Berton, Greensburg, PA (US)

(73) Assignee: Curtiss-Wright Electro-Mechanical Corporation, Cheswick, PA (US)

(*) Notice: Subject to any disclaimer, the term of this patent is extended or adjusted under 35 U.S.C. 154(b) by 312 days.

(21) Appl. No.: 13/228,483

(22) Filed: Sep. 9, 2011

(65) Prior Publication Data

US 2012/0068555 A1   Mar. 22, 2012

Related U.S. Application Data

(60) Provisional application No. 61/381,180, filed on Sep. 9, 2010.

(51) Int. Cl.
*H01H 9/54* (2006.01)

(52) U.S. Cl.
USPC .......................................... 307/140

(58) Field of Classification Search
USPC .......................................... 307/140
See application file for complete search history.

(56) References Cited

U.S. PATENT DOCUMENTS

| | | | |
|---|---|---|---|
| 4,924,373 A | 5/1990 | Inaba et al. | |
| 6,545,452 B2 | 4/2003 | Bruckmann et al. | |
| 7,269,037 B2 | 9/2007 | Marquardt | |
| 7,518,886 B1 | 4/2009 | Lai et al. | |
| 7,577,008 B2 | 8/2009 | Hiller | |
| 7,835,166 B2 | 11/2010 | Hiller | |
| 7,924,585 B2 | 4/2011 | Sommer | |
| 2004/0146101 A1 | 7/2004 | Pearce | |
| 2008/0205093 A1 | 8/2008 | Davies et al. | |
| 2008/0219036 A1 | 9/2008 | Colombi et al. | |
| 2008/0232145 A1 | 9/2008 | Hiller et al. | |
| 2008/0259661 A1 | 10/2008 | Hiller et al. | |
| 2009/0206666 A1 | 8/2009 | Sella et al. | |

(Continued)

FOREIGN PATENT DOCUMENTS

| | | |
|---|---|---|
| DE | 10031778 | 1/2002 |
| WO | 2007028349 | 3/2007 |

OTHER PUBLICATIONS

Vandermeulen et al, "The Reliability of Neural Point Clamped vs. Cascaded H-Bridge Inverters", White Paper TD02000001E, Eaton, Oct. 2009; http://www.eaton.com/ecm/groups/public/@pub/@electrical/documents/content/td02000001e.pdf.

(Continued)

*Primary Examiner* — Robert L. DeBeradinis
(74) *Attorney, Agent, or Firm* — Reed Smith LLP

(57) ABSTRACT

A modular multilevel converter system. The system includes a plurality of series connected two-terminal M2LC subsystems and a control system module. The two-terminal M2LC subsystems are arranged into at least two output phase modules. A first one of the output phase modules defines a total value of inductance and includes a positive arm and a negative arm. The control system module is configured to apply selectively reassigned modulated switch functions to only one of the following at a given instance of time: the two-terminal M2LC subsystems of the positive arm of the first one of the output phase modules or the two-terminal M2LC subsystems of the negative arm of the first one of the output phase modules. The selective reassigning of the modulated switch functions forces charge balance of the individual capacitors of the series connected two-terminal M2LC subsystems at a predetermined rate.

22 Claims, 10 Drawing Sheets

(56) References Cited

U.S. PATENT DOCUMENTS

| | | |
|---|---|---|
| 2009/0274051 A1 | 11/2009 | Boswell et al. |
| 2010/0020581 A1 | 1/2010 | Mazzola et al. |
| 2011/0002149 A1 | 1/2011 | Hiller et al. |
| 2011/0018481 A1 | 1/2011 | Hiller |
| 2011/0049994 A1 | 3/2011 | Hiller et al. |
| 2011/0089873 A1 | 4/2011 | Blöcher et al. |

OTHER PUBLICATIONS

Search Report and Written Opinion for corresponding International Application No. PCT/US2011/050902 dated Jan. 6, 2012.
International Preliminary Report on Patentability for corresponding International Application No. PCT/US2011/50902, dated Mar. 12, 2013.
Alves, et al., "Medium Voltage Industrial Variable Speed Drives", WEG Automação, Brazil, 2009.
Song, et al., "Multilevel Optimal Modulation and Dynamic Control Strategies for STATCOMs Using Cascaded Multilevel Inverters", IEEE Transactions on Power Delivery, vol. 22, No. 3, Jul. 2007, pp. 1937-1946.
Lesnicar, et al., "An Innovative Modular Multilevel Converter Topology Suitable for a Wide Power Range", Power Tech Conference Proceedings, 2003, IEEE Bologna, vol. 3, Jun. 2003, p. 1-6.
Allebrod, et al., "New Transformerless, Scalable Modular Multilevel Converters for HVDC-Transmission", IEEE; 2008; pp. 174-179.
Glinka, "Prototype of Multiphase Modular-Multilevel-Converter with 2MW power rating and 17-level-output-voltage", Power Electronics Specialist Conference, 2004 IEEE, vol. 4, pp. 2572-2576.
Marquardt, et al., "New Concept for High Voltage-Modular Multilevel Converter PESC 2004 Conference in Aachen, Germany", 2004.
Glinka, et al., "A New AC/AC Multilevel Converter Family", IEEE Transactions on Industrial Electronics, vol. 52, No. 3, Jun. 2005, pp. 662-669.

SYSTEM AND METHOD FOR CONTROLLING A M2LC SYSTEM

CROSS-REFERENCE TO RELATED APPLICATION

This application claims the benefit under 35 U.S.C. §119(e) of the earlier filing date of U.S. Provisional Patent Application No. 61/381,180 filed on Sep. 9, 2010.

BACKGROUND

This application discloses an invention which is related, generally and in various embodiments, to a system and method for controlling a Modular Multilevel Converter (M2LC) system.

Many papers have been published regarding the Modular Multilevel Converter (M2LC) topology. FIG. 1 illustrates a two-level configuration of an M2LC cell having two terminals, FIG. 2 illustrates a three-level configuration of an M2LC cell having two terminals, and FIG. 3 illustrates a M2LC system.

As shown in FIG. 1, the M2LC cell includes two switching devices, two diodes, a capacitor and two terminals. With the configuration shown in FIG. 1, the two switching devices can be controlled such that one of two different potentials (e.g., zero volts or $V_{cap}$) may be present across the two terminals. As shown in FIG. 2, the M2LC cell includes four switching devices, four diodes, two capacitors and two terminals. With the configuration shown in FIG. 2, the four switching devices can be controlled such that one of three different potentials (e.g., zero volts, $V_{cap}$, or $2V_{cap}$) may be present across the two terminals. Although other topologies of the M2LC cells are possible, all of the topologies may be defined as two-terminal subsystems or cells with internal capacitor energy storage(s) which are capable of producing various levels of voltages between the two terminals depending on the state of the switching devices.

As shown in FIG. 3, the M2LC system may be configured as a three-phase bridge which includes a plurality of M2LC cells (subsystems), where the M2LC cells are arranged as three output phase modules. Of course, other M2LC systems may be configured differently than shown in FIG. 3. For example, other M2LC systems may be configured as two output phase modules. For the M2LC system of FIG. 3, each output phase module includes a plurality of series-connected M2LC cells, and each output phase module is further arranged into a positive arm (or valve) and a negative arm (or valve), where each arm (or valve) can be separated by an inductive filter. Each output phase module may be considered to be a pole. The respective inductive filters are utilized in the M2LC topology when more than one pole of the M2LC system is paralleled on one common DC bus. The inductive filters operate to reduce currents produced by the switching in the arms of the M2LC system. The spectral content of the arm currents can be shown to be a function of the switch functions and the output current of the pole. Some embodiments of the M2LC system employ inductive filters which have relatively large inductance values along with an active pole current controller to ultimately control the quality of the arm currents.

Although not shown in FIGS. 1-3 for purposes of simplicity, it will be appreciated that each M2LC cell also includes a local controller, and each local controller may be communicably connected to a higher level controller (e.g., a hub controller) of the M2LC system.

It will be appreciated that the M2LC topology possesses the advantages of the Cascaded H Bridge (CCH) topology in that it is modular and capable of high operational availability due to the ability to add one or more redundant cells in each arm. Additionally, the M2LC topology can be applied in common bus configurations. In contrast to M2LC, CCH requires the utilization of a multi-winding transformer which contains individual secondary windings which supply input energy to the cells.

However, unlike CCH, the M2LC cells are not independently supplied from isolated voltage sources or secondary windings. For a given M2LC cell, the amount of energy output at one of the two terminals depends on the amount of energy input at the other one of the two terminals and to some extent the ability of the cell to store and release energy. This can cause a problem in controlling the DC link voltages in these cells during pre-charge of the power circuit or during abnormal operation when one or more of the cells needs to be bypassed or made inactive.

Various methods of balancing the DC link voltages actively from the hub control system of the M2LC system have been employed but such methods require excess sub-system or cell capacity (in the form of extra cells or partially modulated cells). These methods are also relatively complicated in that they require ongoing monitoring of each subsystem link voltage and the use of a complicated sorting system which selects particular cells for modulation depending on their relative DC link voltage and the direction and magnitude of the output current level. Furthermore, these methods tend to perform poorly at low output current levels and frequencies, and require that a load is connected and conducting current in order to supply the needed charge to balance the capacitor voltages.

Additionally, various methods of implementing cell bypass have been employed which require that redundant cells be added to the M2LC system of FIG. 3. The methods require the redundant cells to provide n+1 redundancy, n+2 redundancy, etc. by adding one additional cell row (rank), two additional cell rows, etc. to both the positive and negative arms of the output phase modules, and operating the redundant cells along with the normal number of required ranks under normal conditions. With these methods, when a particular cell fails in one arm (e.g., a cell in the positive arm of phase A), that cell is shorted by a switch (not shown), thereby placing the failed cell into a "0" state, and a complement cell (e.g., a cell in the negative arm of phase A) is placed in a "1" state to re-balance the voltages so that the sum of all cell voltages in a given output phase module equals the total DC link voltage. To keep the output voltages balanced, these methods duplicate the shorting of cells and placing a "1" state likewise in the other output phase module(s) (e.g., as required in the poles of B and C phase) so that the output line to line voltage is not affected by harmonics.

However, such methods suffer various shortcomings, two of which are described hereinbelow. First, placing a compensating "1" in the complement cell (the cell opposite the shorted cell) causes significant voltage ripple to occur in the individual DC links of the cells which contain the constant "1" state. The voltage ripple becomes significantly worse as more ranks are added to increase the cell redundancy level. Second, requiring all of the cells, both the normal number of cells required and the redundant cells, to operate under normal conditions causes a reduction in the efficiency of the M2LC system and an increase in the KVA rating of the M2LC system relative to what the efficiency and KVA rating would normally be if the minimum number of required cells were installed for the non cell bypass option.

Additional issues with known M2LC systems include acceptable operation at low output frequencies and the ability to develop sufficient DC output current. These performance features can be very important when the M2LC system is utilized for AC motor control, particularly for high starting torque applications. Since there is no external voltage source supplying the cell such as with the CCH topology, the output fundamental current should be fully maintained in the cells and their energy storage devices. Since it is well known that the impedance of a capacitor or electrical condenser monotonically increases with each decrease in output frequency, the resulting peak ripple voltage in the M2LC cell can exceed damaging levels at low frequencies under even rated current condition. Likewise, the ability of the M2LC system to produce DC current, which is important in starting brushless or synchronous motor applications, is difficult to attain with the M2LC system using known control techniques.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

Figure 1:
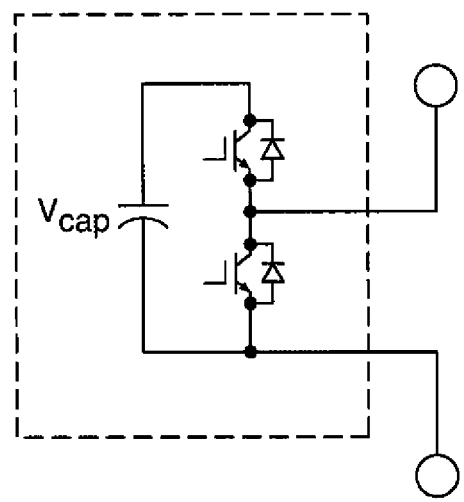
FIG. 1 illustrates a two-level configuration of an M2LC cell having two terminals.
Figure 2:
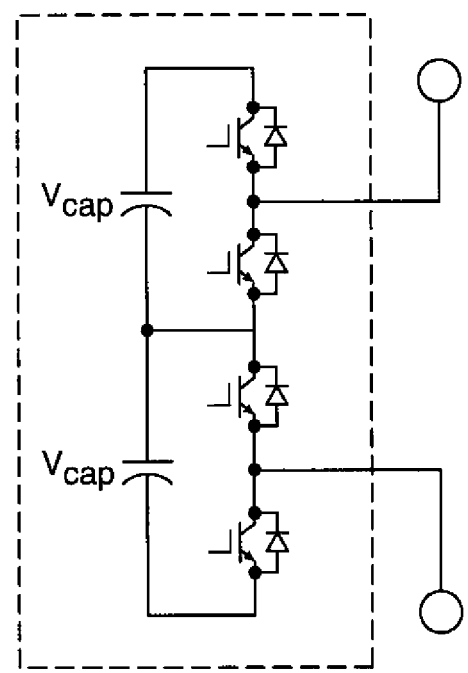
FIG. 2 illustrates a three-level configuration of an M2LC cell having two terminals.
Figure 3:
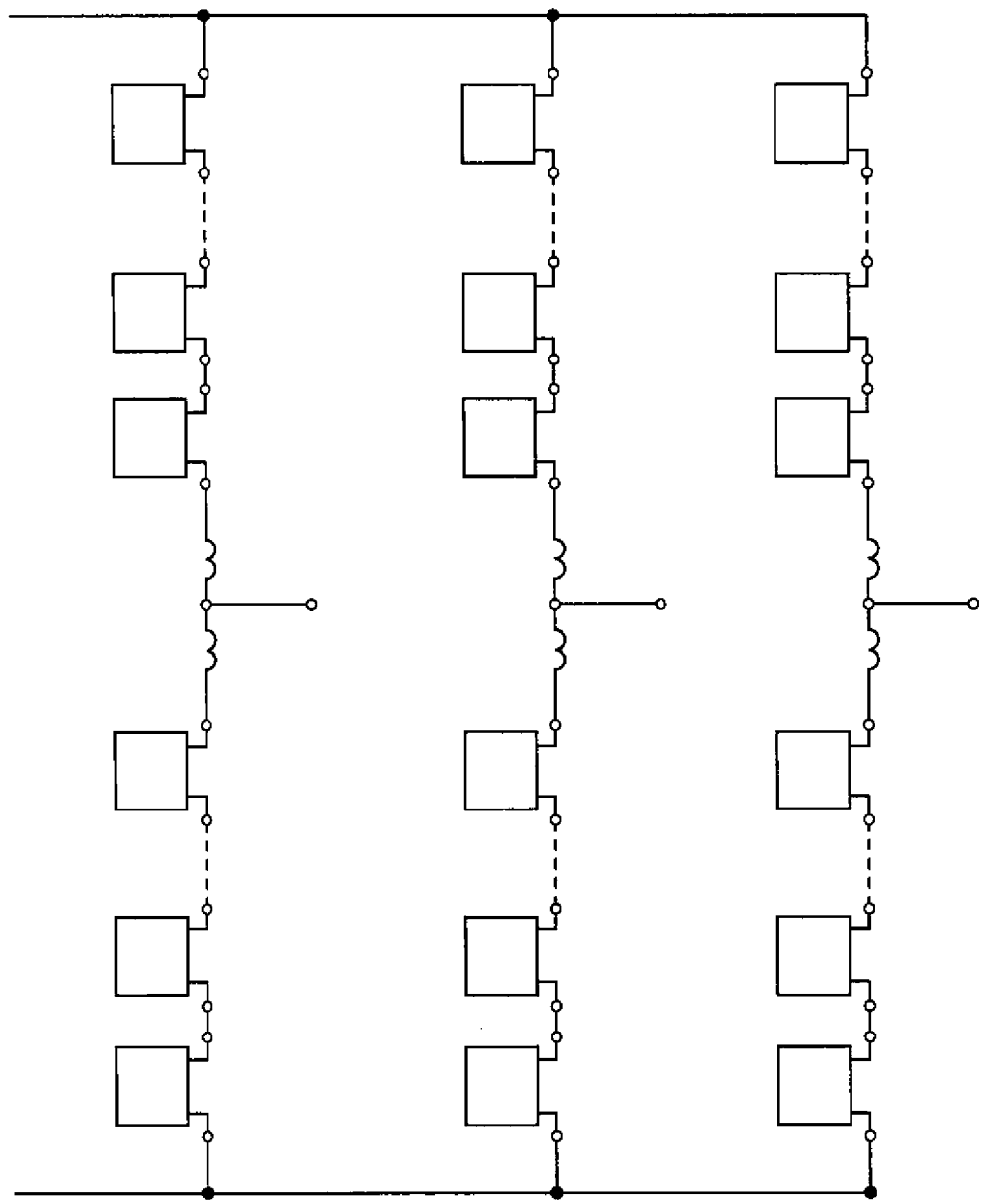
FIG. 3 illustrates a M2LC system having a plurality of M2LC cells.
Figure 4:
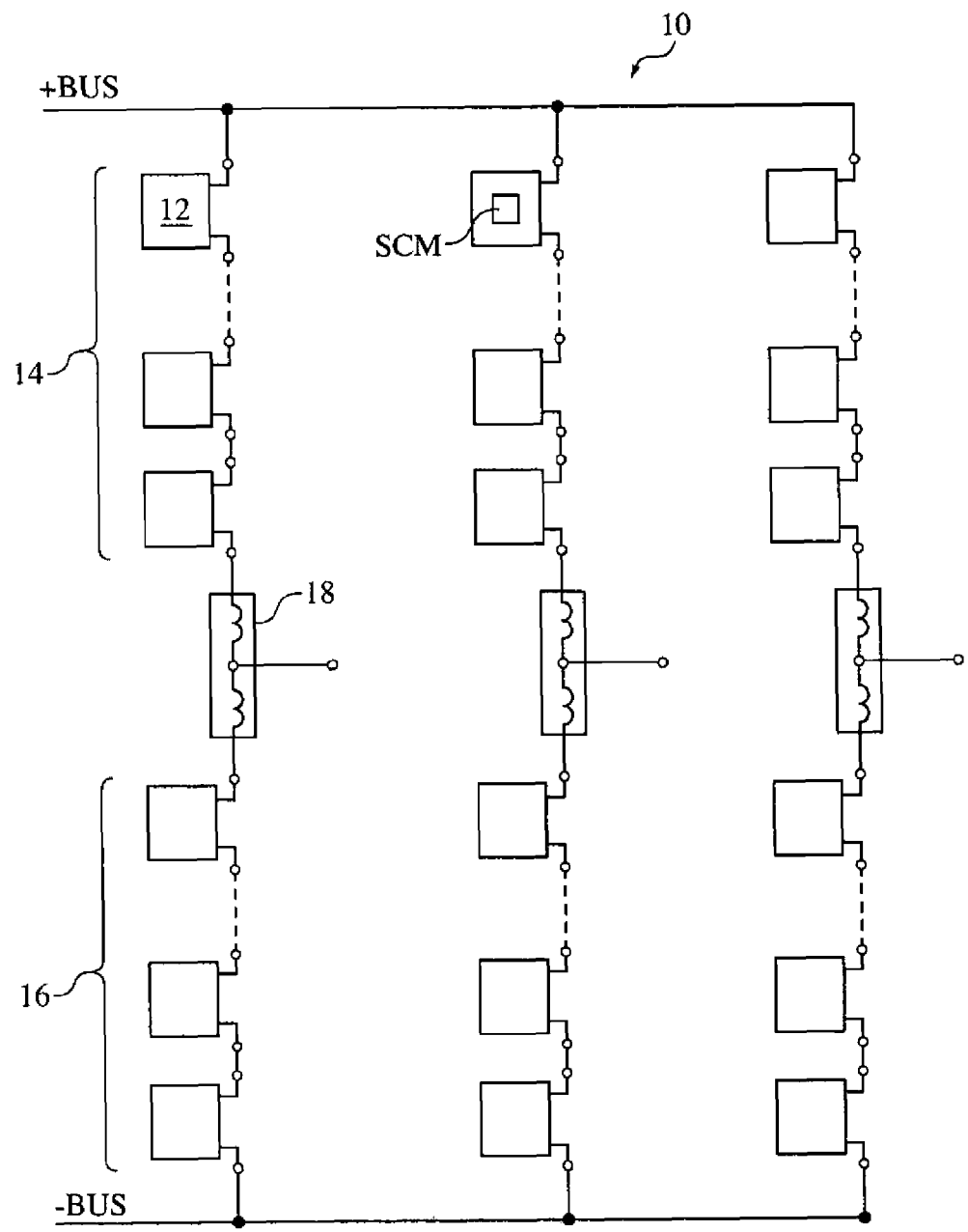
FIG. 4 illustrates various embodiments of a M2LC system having a plurality of M2LC subsystems.

FIG. 4 illustrates various embodiments of a M2LC system 10 having a plurality of M2LC subsystems 12. The M2LC system 10 is similar to the M2LC system of FIG. 3 in that the M2LC subsystems 12 are arranged as output phase modules, with each output phase module further arranged into a positive arm 14 and a negative arm 16. However, as explained in more detail hereinafter, in contrast to the M2LC system of FIG. 3, an output phase module of the M2LC system 10 of FIG. 3 defines a total value of inductance which is much smaller than the inductance of an output module of the M2LC system of FIG. 3. For example, according to various embodiments, the total value of the inductance for an output phase module of the M2LC system 10 of FIG. 4 is approximately 40-50 times smaller than the inductance of an output phase module of the M2LC system of FIG. 3. For the output phase module of the M2LC system 10 of FIG. 4, the "smaller" deterministically defined total value of inductance allows a system control module (SCM) to control the M2LC system 10 in a manner which auto balances the capacitor voltages of the respective M2LC subsystems 12 and minimizes the fundamental capacitor voltage ripple. Although the system control module (SCM) is shown in FIG. 4 as residing at the respective M2LC subsystems 12 (only one SCM is shown for purposes of clarity), it will be appreciated that according to other embodiments, the system control module may reside at a higher level controller (e.g., the hub controller) of the M2LC system 10. Various embodiments of the system control module will be described in more detail hereinbelow.

The total value of inductance defined by a given output phase module of the M2LC system 10 may be realized in any number of different ways. For example, according to various embodiments, the total value of inductance may be realized by including a deterministically sized inductive filter 18 connected between the positive and negative arms 14, 16 as shown in FIG. 4. Although the inductive filter 18 is shown in FIG. 4 as having two inductors connected between the positive and negative arms 14, 16 of an output phase module, it will be appreciated that the inductive filter 18 may have any number of inductors (e.g., one, two, three, four, etc.) connected between the positive and negative arms 14, 16 of an output phase module. Regardless of whether one, two, three, four, etc. inductors are connected between the positive and negative arms 14, 16 of an output phase module, the individual inductors are deterministically sized so that the total inductance of the output phase module equals the desired total value of inductance so that the system control module (SCM) can control the M2LC system 10 in a manner which auto balances the capacitor voltages of the respective M2LC subsystems 12 and minimizes the fundamental capacitor voltage ripple.

According to other embodiments, the total value of inductance may be realized by including one or more smaller deterministically sized inductors distributed amongst one or more of the M2LC subsystems 12 of the output phase module. This arrangement may be done in lieu of or in conjunction with an inductive filter 18 being connected between the positive and negative arms 14, 16. The one or more smaller deterministically sized inductors may be connected to output terminals of a plurality of the M2LC subsystems 12 of the output phase module. For these embodiments, the total inductance of the output phase module sums to the desired value of inductance so that the system control module (SCM) can control the M2LC system 10 in a manner which auto balances the capacitor voltages of the respective M2LC subsystems 12 and minimizes the fundamental capacitor voltage ripple. Thus, it will be appreciated that the desired value of inductance can be realized regardless of the number of inductors utilized, whether the inductors are connected between the positive and negative arms 14, 16, whether the inductors are distributed amongst the M2LC subsystems 12, whether the inductors are connected to output terminals of a plurality of the M2LC subsystems 12, etc.

According to yet other embodiments, the total value of inductance may be realized solely by the parasitic inductance of the output phase module. For such embodiments, it may not be necessary to include any "additional" inductors in the output phase module, thereby allowing for a reduction in the amount of capacitance in the M2LC subsystems 12 and a reduction in the overall cost of the M2LC subsystem 10. Although the total value of inductance has been described in the context of the output phase module/pole, it will be appreciated that the total inductance in each arm may also be deterministically realized by utilizing one or more of the above-described embodiments.

Figure 5:
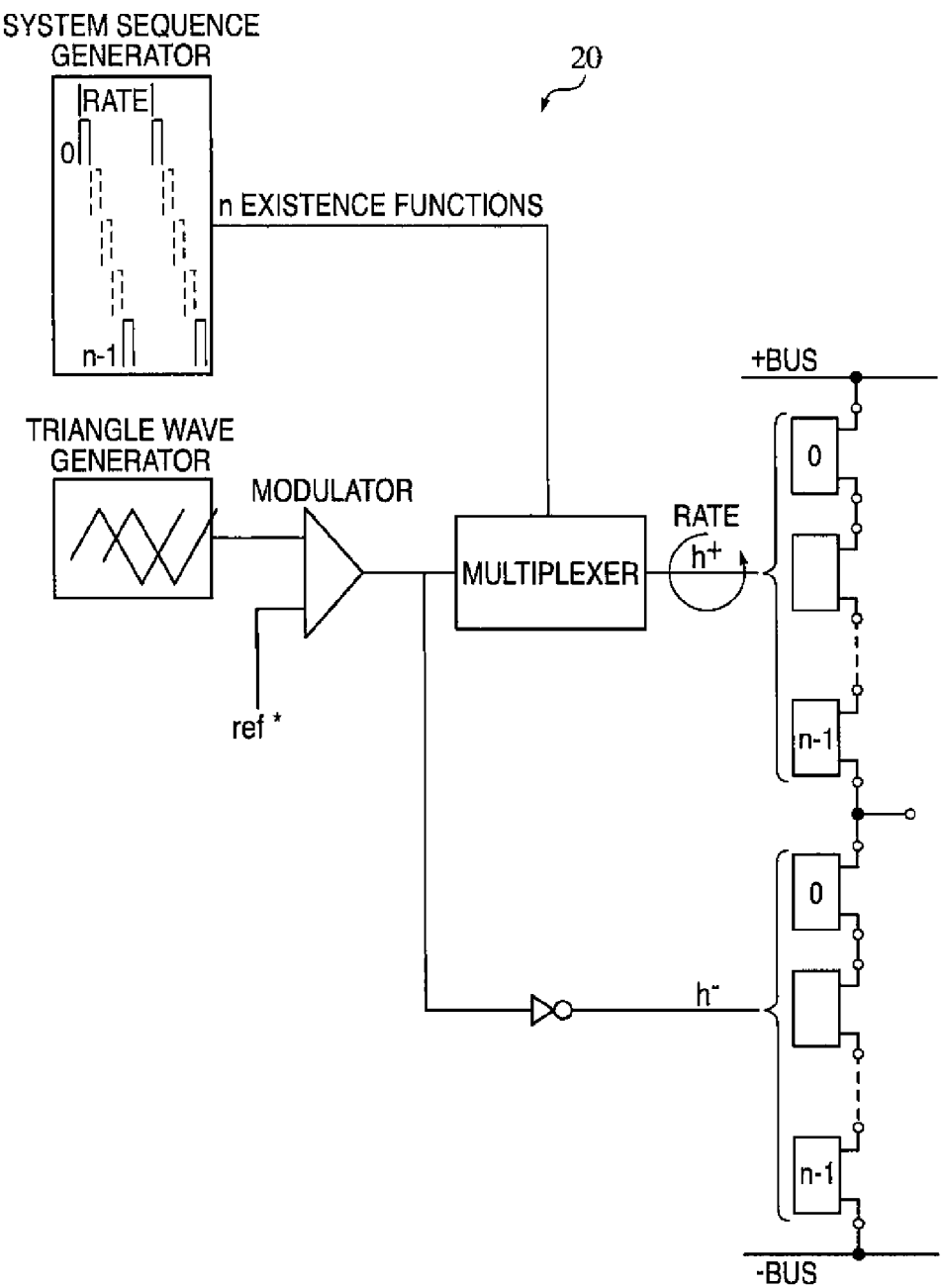
FIG. 5 illustrates a high level representation of a system control module of the M2LC system of FIG. 4 according to various embodiments.

FIG. 5 illustrates a high level representation of the system control module 20 of the M2LC system 10 according to various embodiments. For purposes of clarity, only a portion of the M2LC system is shown in FIG. 5. The system control module 20 (or its functional equivalent) may be utilized to control the M2LC system 10 in a manner which minimizes the voltage balance and fundamental output frequency ripple voltage shortcomings associated with other M2LC systems if the defined total value of inductance of each output phase module is sized appropriately with the effective arm capacitance to make (1) the impedance of each output phase module low enough to allow a low rate of switch "reassignment" of the switch functions (described in more detail hereinbelow) to auto balance the capacitor voltages of the M2LC subsystems 12 and (2) the resonant frequency high enough relative to the switching frequency to allow phase control of the switching devices to allow a certain degree of two-level operation (described in more detail hereinbelow) to cancel a majority of the fundamental current component in the capacitors of the M2LC subsystems 12. It will be appreciated that this two-level operation implies that the M2LC subsytems 12 in each arm spend a sufficient time in the zero voltage state and thus connected to either the plus (+) bus or the minus (−) bus long enough so that the fundamental arm current cancels with the other phases. To realize this, the resonate frequency of the pole formed by pole inductance and series arm capacitance (See FIG. 9) must be greater than the switching frequency of the switch functions.

The system control module 20 may be implemented in hardware, firmware, software and combinations thereof, and may reside at the higher level controller (the hub controller) of the M2LC system. According to other embodiments, the system control module 20 may reside at the local controllers (See, e.g., controller 56 in FIG. 8) of the respective M2LC subsystems 12. For embodiments utilizing software, the software may utilize any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. For embodiments where the system control module 20 is embodied as software (e.g., software application, computer program), the software may be stored on a computer-readable medium (e.g., disk, device, and/or propagated signal) such that when a computer reads the medium, the functions described herein are performed.

As shown in FIG. 5, the functionality of the control system module 20 is an adaptation of a traditional triangle PWM modulator used for a multilevel system such as M2LC or CCH. The high level representation shown in FIG. 5 illustrates performance features of switch "reassignment" and relative two-level operation. In contrast to the traditional PWM modulator, the control system module 20 includes the functionality of a subsystem sequence generator which produces "n" distinct existence functions for the "n" M2LC subsystems 12 which comprise either the positive arm 14 or negative arm 16 of a given output phase module. The subsystem sequence generator may be controlled by the variable "rate" which defines the complete period at which each function repeats.

In further contrast to the traditional PWM modulator, the functionality of the triangle wave generator, which is a set of triangle waveforms which are normally spaced by the value of $2\Pi/n$, utilizes an additional variable "omega" which can be varied between 0 and 1. Thus, for this embodiment, the spacing between the triangle waveforms may be represented by the value of "$(2\Pi/n)\times(omega)$". The variable "omega" controls the relative phase displacement of the respective triangle waveforms such that when "omega"=1, the triangle waveforms are optimally spaced for low output voltage distortion from the output phase module. When "omega"=0 these triangle waveforms produce zero phase shift which causes the output phase module of the M2LC system 10 to switch like a two-level bridge.

Omega may be controlled to low values (for instance 0.1) for applications in which the M2LC system 10 must produce high currents and low output frequencies. With omega controlled to such a value, the desired effect of switch "reassignment" to auto balance the capacitor voltages of the M2LC subsystems 12 still works, the arms 16,18 can be respectively connected to the plus (+) bus or the minus (−) bus for the required time to cancel the fundamental current component in the capacitors (assuming the required time is longer than the period of the pole resonant frequency), and at low modulation levels, the multilevel line to line voltage quality is as good as or better than is the case when omega is set equal to 1. Operating at this relative two-level mode also allows the M2LC system 10 to produce significant values of DC current which may be required for certain applications.

In yet further contrast to the traditional PWM modulator, the functionality of the subsystem sequence generator feeds a multiplexer that causes the modulated switch function "h+" applied to the M2LC subsystems 12 of the positive arm 14 to be "reassigned" at a period defined by the variable "rate". For the embodiments shown in FIG. 5, there is no switch function "reassignment" associated with the M2LC subsystems 12 of the negative arm 16. However, it will be appreciated that according to other embodiments, the switch function "reassignment" may be utilized with the M2LC subsystems 12 of the negative arm 16 instead of with the M2LC subsystems 12 of the positive arm 14. It is this "reassignment" effect which forces the capacitor charges in the M2LC subsystems 12 of each arm to balance even when one of the M2LC subsystems 12 contains a loss element of significant percentage of the M2LC subsystem rating which could cause the energy storage device to lose charge.

In general, the "reassignment" shown in FIG. 5 is carried out so that after a certain number of periods have been completed, where the certain number of periods is equal to the number of M2LC subsystems 12 in the positive arm 14 of the output phase module, each of the values of the modulated switch functions will have been applied to each of the M2LC subsystems 12 in the positive arm 14 of the output phase module.

It will be appreciated that the "reassignment" may be implemented in a number of different ways. For example, according to various embodiments, if there are three M2LC subsystems 12 in the positive arm 14 of an output phase module, for a given period (e.g., period 1), the first value of the modulated switch function is applied to the first M2LC subsystem 12, the second value of the modulated switch function is applied to the second M2LC subsystem 12, and the third value of the modulated switch function is applied to the third M2LC subsystem 12. For the next period (e.g., period 2), the first value is applied to the second M2LC subsystem 12, the second value is applied to the third M2LC subsystem 12, and the third value is applied to the first M2LC subsystem 12. For the next period (e.g., period 3), the first value is applied to the third M2LC subsystem 12, the second value is applied to the first M2LC subsystem 12, and the third value is applied to the second M2LC subsystem 12. The above-described sequence of reassignment may be referred to as a rotation.

According to other embodiments, a "reassignment" other than a rotation may be utilized. For example, if there are three M2LC subsystems 12 in the positive arm 14 of an output phase module, for a given period (e.g., period 1), the first value of the modulated switch function is applied to the first M2LC subsystem 12, the second value of the modulated switch function is applied to the second M2LC subsystem 12, and the third value of the modulated switch function is applied to the third M2LC subsystem 12. For the next period (e.g., period 2), the first value is applied to the third M2LC subsystem 12, the second value is applied to the first M2LC subsystem 12, and the third value is applied to the second M2LC subsystem 12. For the next period (e.g., period 3), the first value is applied to the second M2LC subsystem 12, the second value is applied to the third M2LC subsystem 12, and the third value is applied to the first M2LC subsystem 12.

Although a multi-level Pulse Width Modulated (PWM) scheme is shown in FIG. 5 for use with a given output phase module, it will be appreciated that the system control module 20 may utilize other multi-level modulation control schemes to realize the switch function reassignment and the relative phase control described above. For example, according to various embodiments, the system control module 20 may utilize time averaged modulation, state space modulation, etc. It will also be appreciated that the system control module 20 may produce separate sets of existence functions, modulated switch functions, etc. for positive arms (or negative arms) of other output phase modules.

Figure 6:
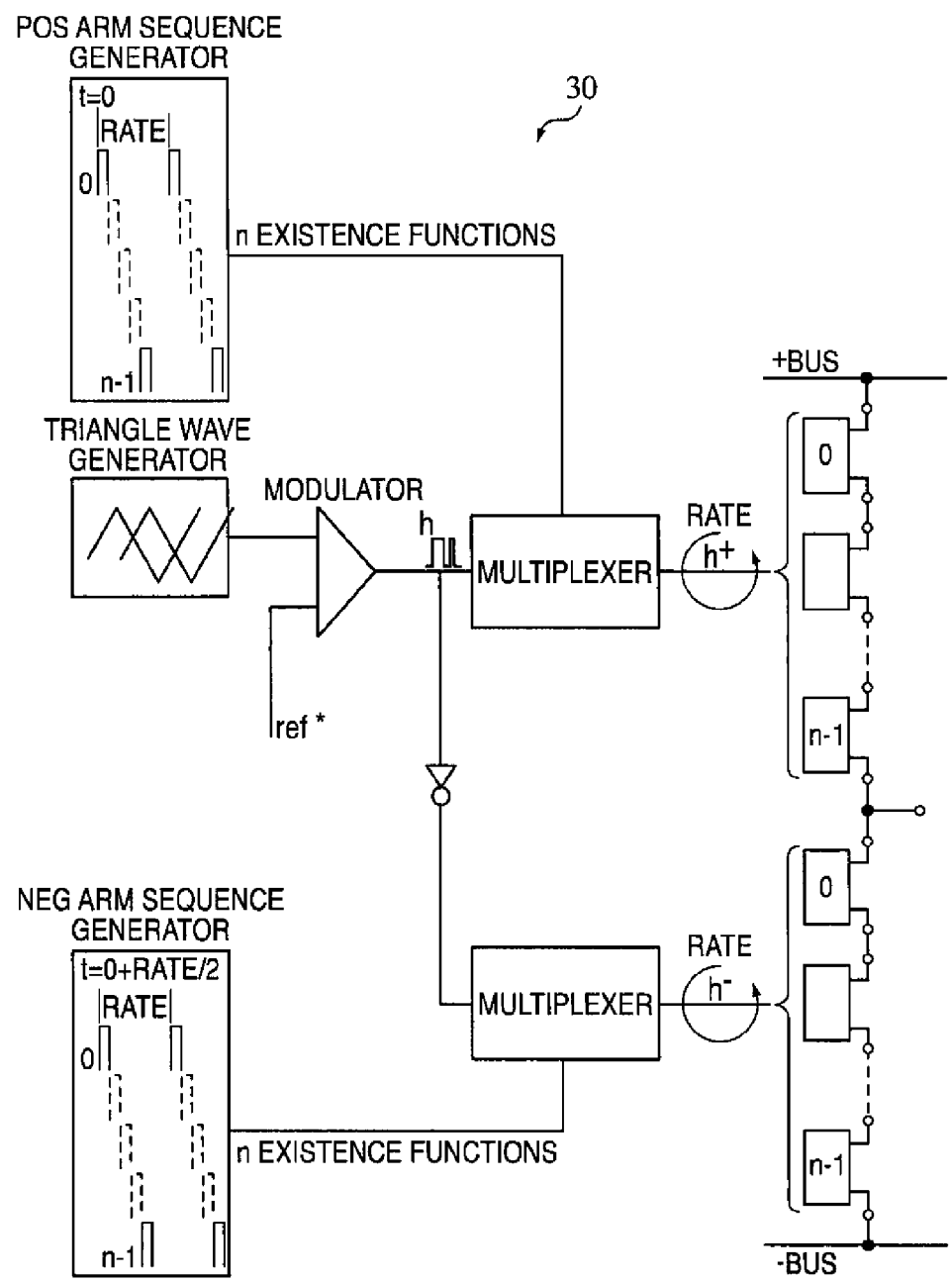
FIG. 6 illustrates a high level representation of a system control module of the M2LC system of FIG. 4 according to other embodiments.

FIG. 6 illustrates a high level representation of a control system module 30 of the M2LC system 10 according to other embodiments. For purposes of clarity, only a portion of the M2LC system 10 is shown in FIG. 6. The control system module 30 of FIG. 6 is similar to the control system module 20 of FIG. 5, but is different in that the control system module 30 of FIG. 6 includes the functionality of two subsystem sequence generators (one for the positive arm and one for the negative arm). In FIG. 6, the "n" existence functions produced by the negative arm sequence generator are shifted 180° from the "n" existence functions produced by the positive arm sequence generator. Each subsystem sequence generator is communicably connected to a different multiplexer. This allows for switch "reassignment" in both arms asynchronously (the switch functions of each arm do not reassign at the same instance). The reassignment rates of both arms may be the same but each arm reassignment event is spaced so as not to occur at the same time. For example, according to various embodiments, each arm reassignment event is spaced by a period "rate/2". By utilizing this spacing, the overall voltage balancing of each arm is improved. This spacing may also be utilized for some versions of M2LC subsystem bypass which require that a non-operating switch function which is held in reserve for the bypass event is reassigned in its zero state but is still able to allow for the voltage balance functionality of the control system module 30. It will be appreciated that according to other embodiments, the value of the spacing between the arm reassignments may be other non-zero values other than period "rate/2".

Although a multi-level Pulse Width Modulated (PWM) scheme is shown in FIG. 6 for use with a given output phase module, it will be appreciated that the system control module 30 may utilize other multi-level modulation control schemes to realize the switch function reassignment and the relative phase control described above. For example, according to various embodiments, the system control module 30 may utilize time averaged modulation, state space modulation, etc. It will also be appreciated that the system control module 30 may produce separate sets of existence functions, modulated switch functions, etc. for positive and negative arms of other output phase modules.

Figure 7:
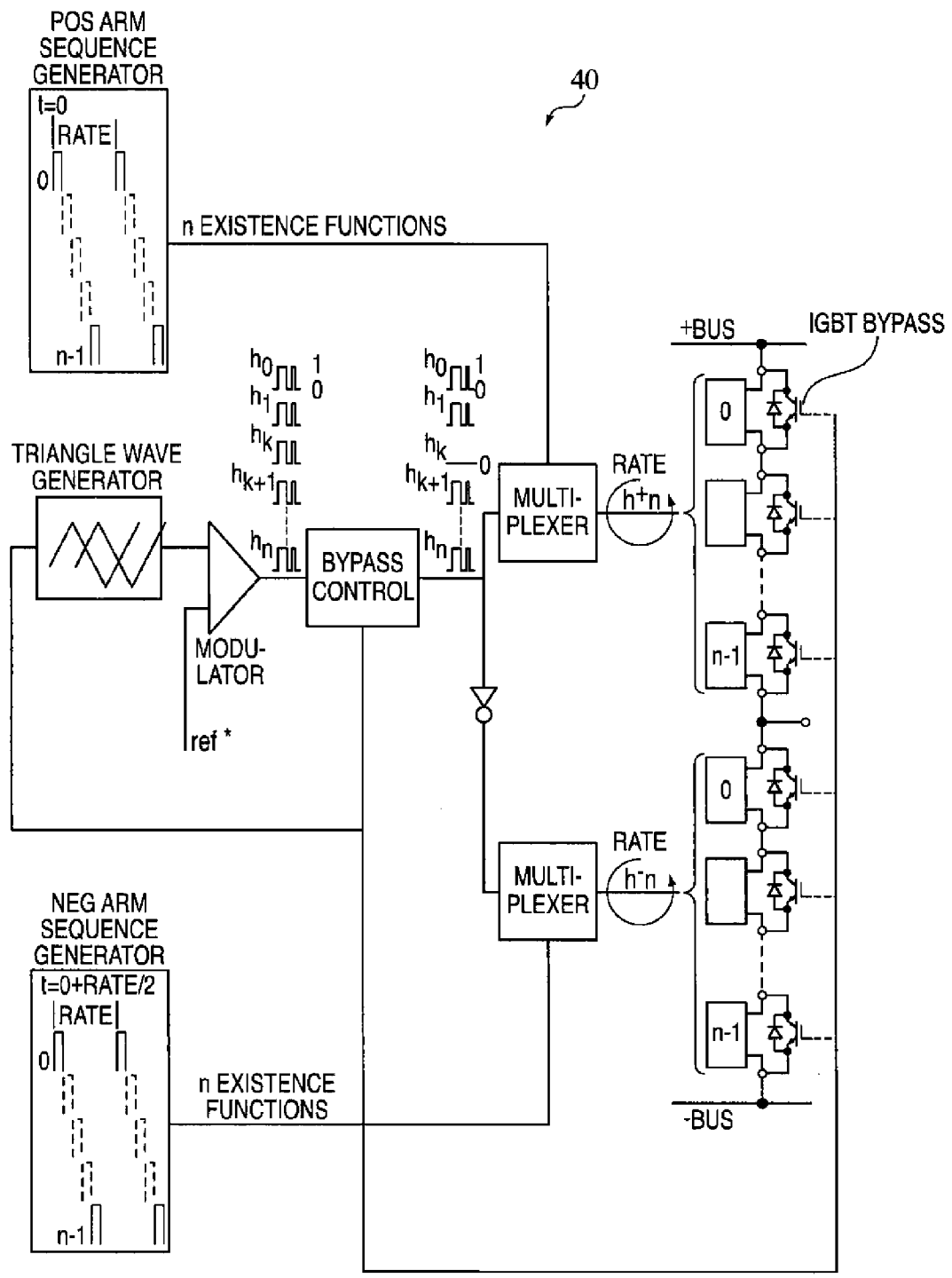
FIG. 7 illustrates a high level representation of a system control module of the M2LC system of FIG. 4 according to yet other embodiments.

FIG. 7 illustrates a high level representation of a control system module 40 of the M2LC system 10 according to yet other embodiments. For purposes of clarity, only a portion of the M2LC system 10 is shown in FIG. 7. The control system module 40 of FIG. 7 is similar to the control system module 30 of FIG. 6, but is different in that the control system module 40 of FIG. 7 includes the bypass control functionality. As shown in FIG. 7, each M2LC subsystem 12 may have a corresponding bypass switch (e.g., IGBT Bypass) connected across the two terminals of the M2LC subsystem 12.

The control system module 40 provides a unique way to implement M2LC subsystem bypass options using the M2LC inverter topology shown in FIG. 4. The bypass control operates to produce a constant "0" state in both the positive and negative arms of all three output phase modules depending on the number of redundant cell ranks to be added. For example, adding 1 rank to the positive and negative arms for minimum n+1 redundancy causes the control system module 40 to produce a constant "0" in the $k^{th}$ M2LC subsystem 12 of each arm. The control system module 40 then reassigns this "0" amongst all the M2LC subsystems 12 so that all of the M2LC subsystems 12 on average can be charged balanced. Upon the actual failure of one M2LC subsystem 12 (for instance in the positive arm of phase A), the faulted M2LC subsystem 12 is forced into a physical "0" state by the bypass switch (IGBT bypass) and its loss of voltage over time would then be replaced by eliminating the reassigned "0" in that arm only. In this way, all other redundant M2LC subsystems 12 are available for use if an additional M2LC subsystem 12 would fail in the negative arm of phase A, and likewise in positive and negative arms of phases B and C. By performing M2LC subsystem bypass in the above-described manner, the detrimental affects of high ripple voltage at low frequencies are avoided. Additionally, any resulting losses are not significantly greater than the losses experienced with M2LC systems which do not include the M2LC subsystem bypass functionality and the resulting KVA rating of the M2LC system is the same as in the no bypass case.

In FIG. 7, the legend "h⁺n" represents the $n^{th}$ value of the modulated switch function "h⁺" and the legend "h⁻n" represents the $n^{th}$ value of the modulated switch function "lf". Although a multi-level Pulse Width Modulated (PWM) scheme is shown in FIG. 7 for a given output phase module, it will be appreciated that the system control module 40 may utilize other multi-level modulation control schemes to realize the switch function reassignment and the relative phase control described above. For example, according to various embodiments, the system control module 30 may utilize time averaged modulation, state space modulation, etc. It will also be appreciated that the system control module 40 may produce separate sets of existence functions, modulated switch functions, etc. for positive and negative arms of other output phase modules.

Figure 8:
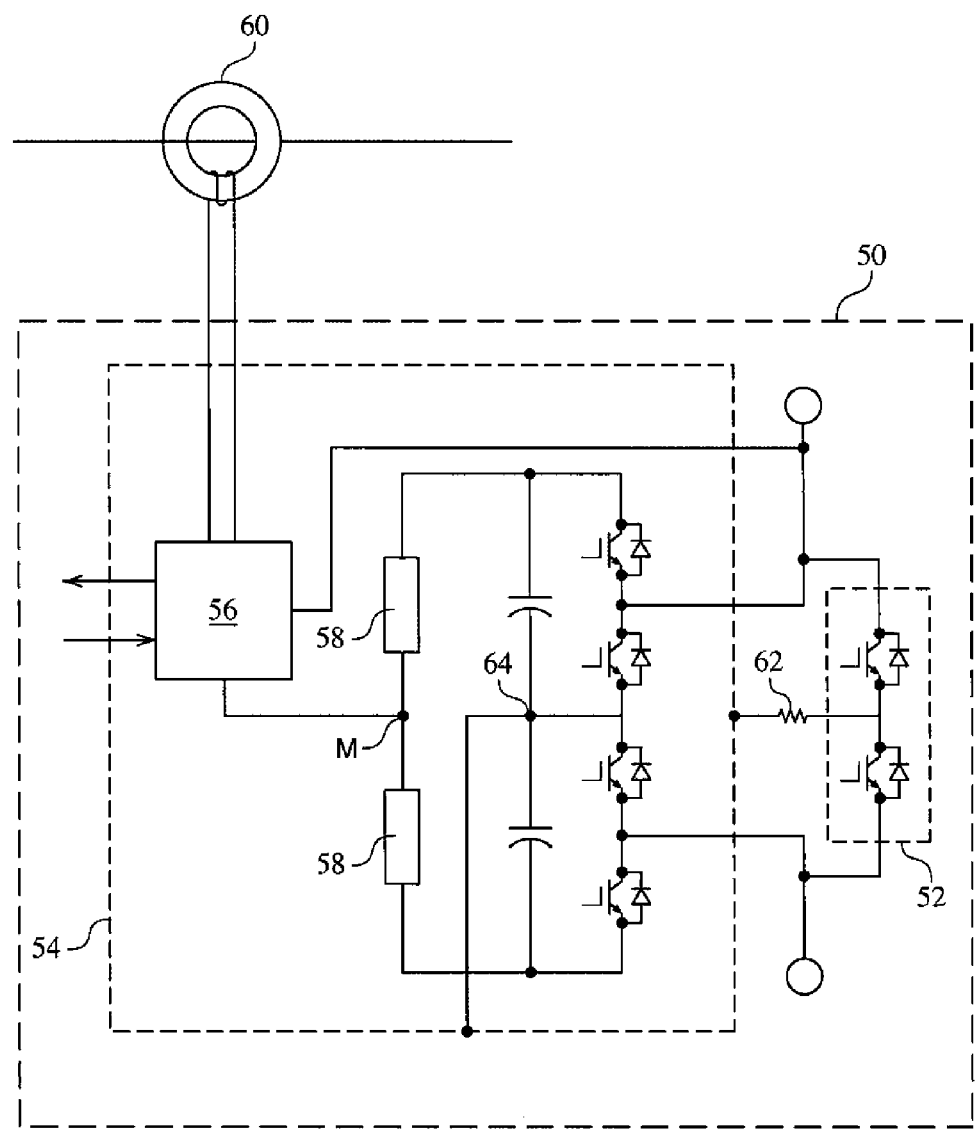
FIG. 8 illustrates various embodiments of a M2LC system which includes a dual IGBT bypass connected to a three-level M2LC cell of the M2LC system.

FIG. 8 illustrates various embodiments of a M2LC system 50. The M2LC system 50 of FIG. 8 is similar to the M2LC system 10 of FIG. 4, but is different in that the M2LC system 50 of FIG. 8 includes a bypass device 52 connected to a three-level M2LC subsystem 54 of the M2LC system 50. For purposes of clarity, only a portion of the M2LC system 50 is shown in FIG. 8. However, it will be appreciated that the M2LC system 50 includes a plurality of M2LC subsystems 54, and each M2LC subsystem 54 may have a corresponding bypass device 52 connected thereto.

As shown in FIG. 8, the M2LC subsystem 54 includes a controller 56, ballast resistors 58, capacitors, switching devices and diodes. The switching devices may be embodied as any suitable type of switching device. For example, as shown in FIG. 8, the switching devices may be embodied as insulated gate bipolar transistors (IGBTs). The controller 56 is electrically connected to a current transformer 60. According to various embodiments, the current transformer 60 supplies power to the controller 56, and the controller 56 supplies power to the respective gate terminals of the switching devices. For purposes of simplicity, the connections between the controller 56 and the gate terminals of the respective switching devices are not shown in FIG. 8. It will be appreciated that for each of the M2LC subsystems 54 in the M2LC system 50, each M2LC subsystem 54 is electrically connected to a corresponding current transformer 60, and the power supplied to a given M2LC subsystem 54 may thus be supplied via only a single corresponding current transformer 60. The controller 56 is also communicably connected to a higher level controller (e.g., a hub controller) via, for example, two optical fibers. For purposes of simplicity, the higher level controller is not shown in FIG. 8.

The bypass device 52 includes two switching devices, and the two switching devices may be embodied as any suitable type of switching devices. According to various embodiments, the two switching devices may be embodied as a packaged set of IGBT's or as individual IGBTs, and the IGBTs can be of the same voltage rating as the IGBT's included in the three-level M2LC subsystem 54. The use of individually controlled dual IGBT's allows for independent discharge of each of the dual storage capacitors if required as a result of failure in the three-level M2LC subsystems 54 by applying a midpoint resistor 62 to the center tap 64 of the storage capacitors. The resistor 62 can be used to discharge each current path before the IGBT set is turned on in tandem to short circuit the three-level M2LC subsystem 54. The resistor 62 also serves to ensure the voltage sharing on each bypass IGBT with reference to the individual DC buses.

The controller 56 is electrically connected to the capacitors and the non-gate terminals of the switching devices indirectly via the ballast resistors 58. The ballast resistors 58 may be any suitable type of ballast resistors. The ballast resistors 58 and the controller 56 collectively define a reference point "M". With this configuration, the voltage at the reference point "M" can be different than the voltage at the center tap 64 of the storage capacitors, current is not conducted from the reference point "M" directly to the center tap 64 of the storage capacitors, and the high resistance nature of the ballast resistors 58 operates to prevent common mode current from flowing into the ground system of the controller 56.

Figure 9:
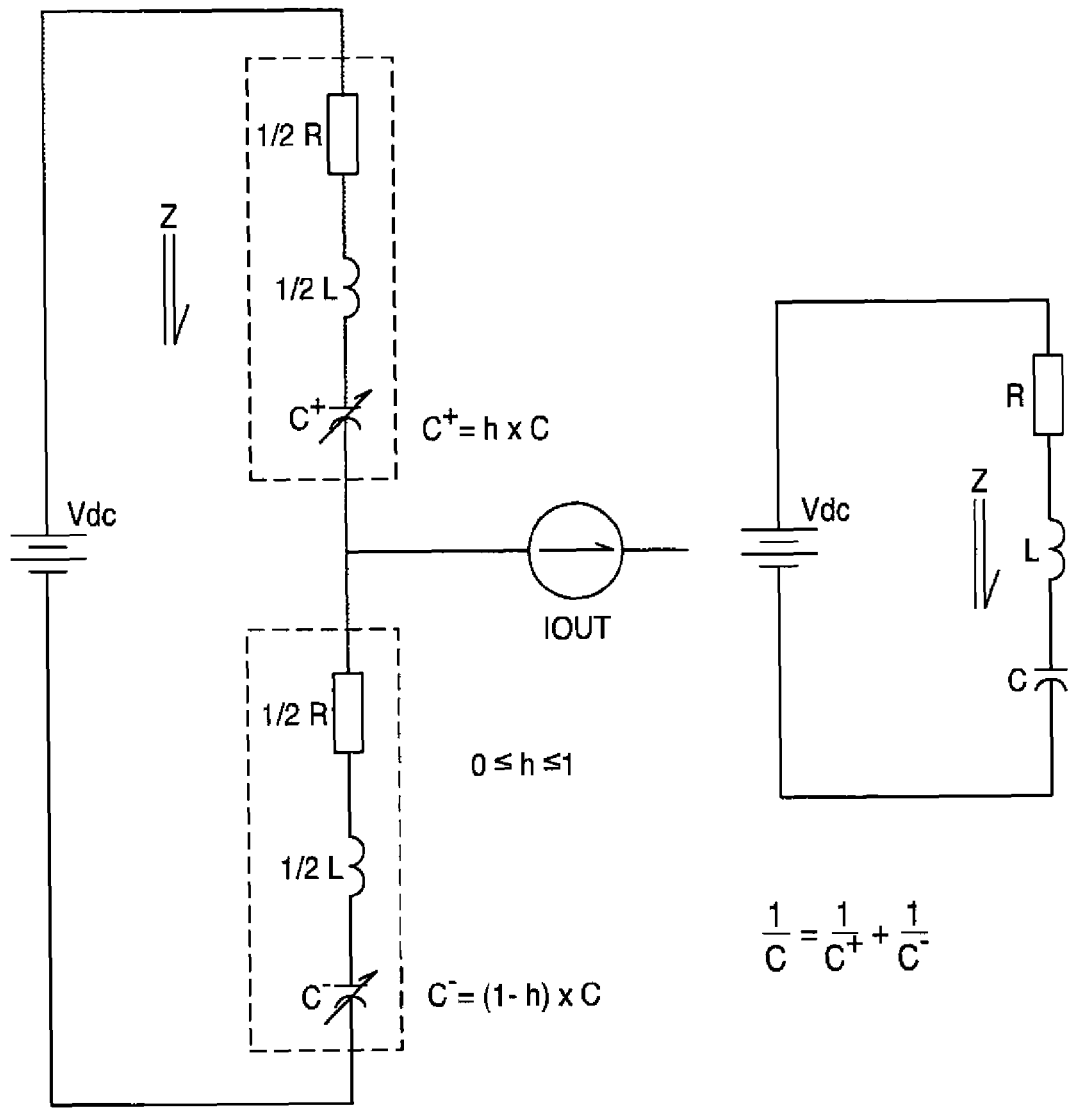
FIG. 9 illustrates a simplified representation of a pole of the M2LC system of FIG. 4.

FIG. 9 illustrates a simplified representation of a pole of the M2LC system 10 of FIG. 4. As shown in FIG. 9, the respective arms of a pole (Z) of the M2LC system 10 may be represented as respective resonant circuits having variable capacitance. It will be appreciated that the arms of the M2LC pole are modulated so that the total switched capacitor voltages sum to the total DC link voltage Vdc, the modulation (h) ranges in value between "0" and "1", and the respective resonant circuits can be reduced to a single LRC circuit since the two arm capacitances, which are each a function of (h), effectively combine to the constant value C which is the total arm capacitance. Therefore, it will be appreciated that the performance of the system control module (e.g., system control module 20, system control module 30, system control module 40, etc.) in auto-balancing the M2LC subsystem capacitor voltages depends on the effective impedance of the pole (Z), and the ability to cancel a majority of the M2LC subsystem capacitors fundamental current component depends on that pole's resonant frequency relative to the rate of the M2LC subsystems switching frequencies. This impedance should be sufficiently low so that the capacitors can share charging current during each gate function reassignment, and it should also be sufficiently low so that the modulation can be controlled (e.g., by reducing the phase shift between gate switch functions) so that the fundamental current in each M2LC pole can be cancelled in part as normally happens with a two-level topology.

Also, if the pole inductor (or inductors) is sized sufficiently small so that its natural resonance with the effective pole capacitance occurs at a value which is significantly greater than both the fundamental operating and switching frequency of the M2LC pole, natural resonance will be sufficiently removed from the normal fundamental and switching frequencies damped by normal circuit losses.

Figure 10:
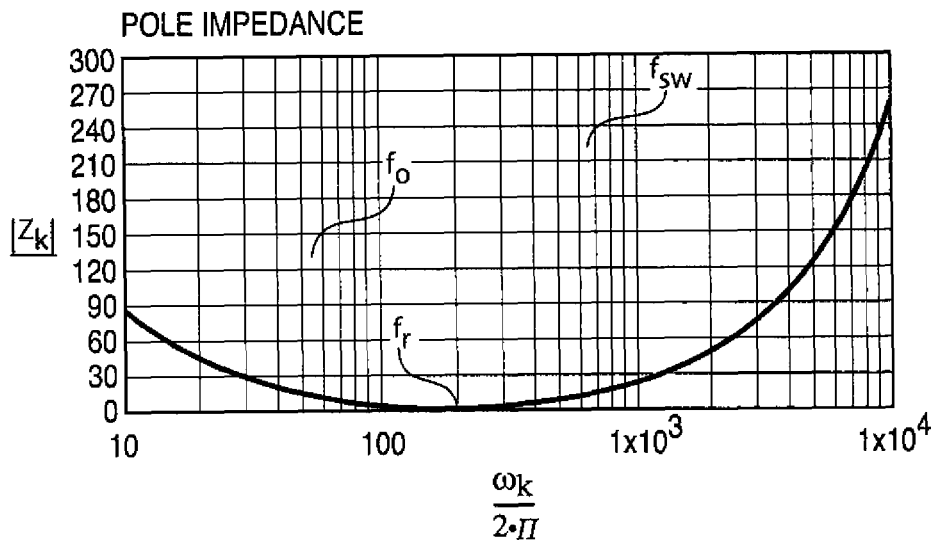
FIG. 10 illustrates the pole impedance and the capacitor voltage response of a M2LC pole of the M2LC system of FIG. 4 when an inductive filter of the M2LC system has a first inductance value.
Figure 10:
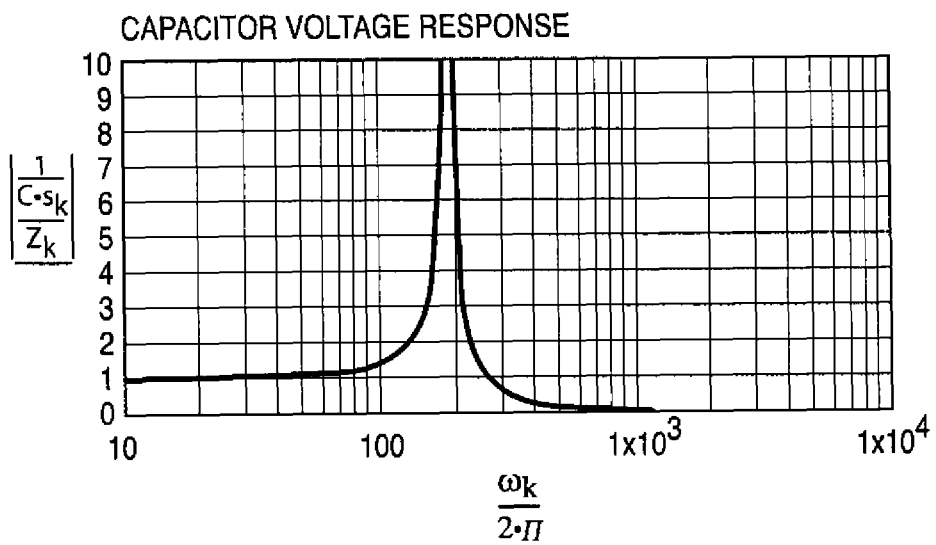
Figure 11:
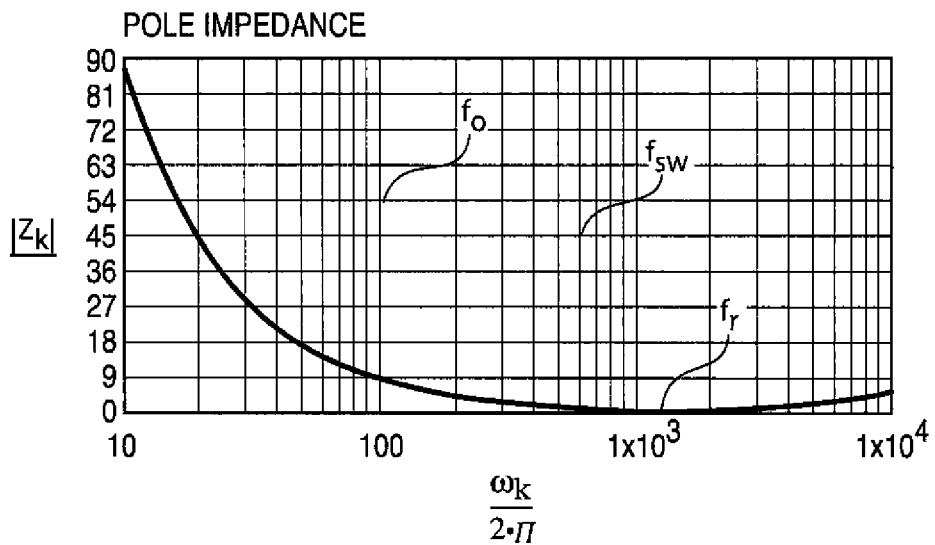
FIG. 11 illustrates the pole impedance and the capacitor voltage response of a M2LC pole of the M2LC system of FIG. 4 when an inductive filter of the M2LC system has a second inductance value.
Figure 11:
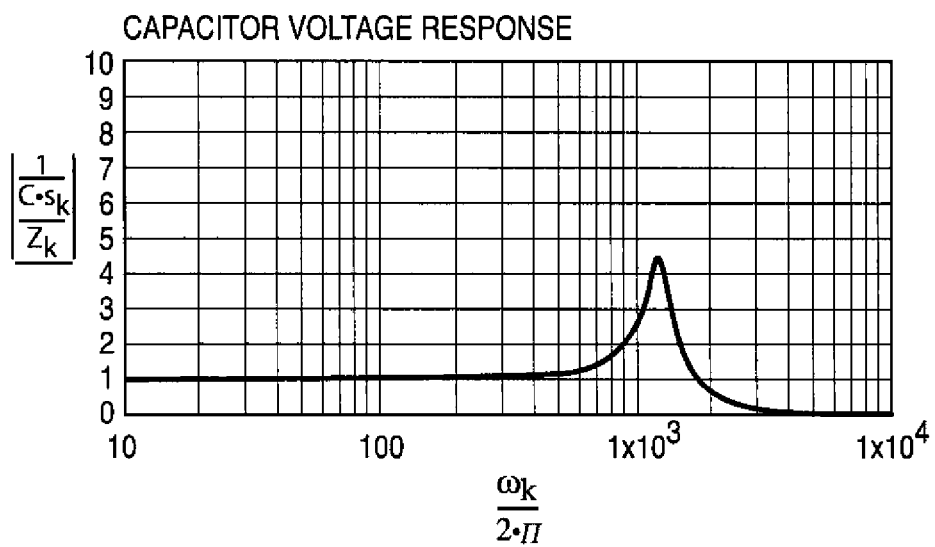

FIGS. 10 and 11 respectively illustrate the pole impedance and the capacitor voltage response of a M2LC pole of the M2LC system 10 of FIG. 4 when an inductive filter 18 of the M2LC system 10 has a first inductance value (FIG. 10) and a second inductance value (FIG. 11). The circuit values shown in FIGS. 10 and 11 are representative of actual values which might be utilized in a 4.1 kv 1000 HP 3-phase variable frequency drive. The first inductance value is an inductance value which is typically utilized in known M2LC systems. The second inductance value is an inductance value which is utilized in M2LC systems which are controlled by the above-described system control module (e.g., system control module 20, system control module 30, system control module 40, etc.).

For the values shown in FIG. 10, the output current frequency (the operating frequency "fo") is usually less than the resonant frequency "fr", and the switching frequency "fsw" is usually greater than the resonant frequency "fr". However, for the values shown in FIG. 11, the resonant frequency "fr" is sufficiently greater than the operating frequency "fo" and is also greater than the switching frequency "fsw".

By comparing the first and second inductance values, it will be appreciated that the inductance value of the pole inductor to be utilized with the control system modules described hereinabove may be approximately 40 to 50 times smaller than a pole inductor utilized in prior art systems. Thus, it will also be appreciated that the size, cost and loss associated with the pole inductor to be utilized with the control system modules described hereinabove are also significantly less than the size, cost and loss associated with the pole inductor utilized in prior art systems.

In view of the foregoing, it will be appreciated that the control system modules described herein, in combination with the selection of pole filter impedance and resonance in relation to fundamental and switching frequencies, allow for voltage balance and reduced ripple voltage to be achieved without the need for complicated monitoring and control from the higher level controller (the hub control) of the M2LC system. It will also be appreciated that the control system modules described herein are capable of forcing charge balance operation of the DC link voltages under no load current and output voltage conditions and that the control system modules also allow for the generation of DC output current, ripple voltage control at low output frequencies and the generation of "zero" voltage cells for high redundancy. It should also be appreciated that the control system modules described herein are achievable when the pole inductance placed between each arm (or the total inductance connected to output terminals of M2LC subsystems 12) is sufficiently low such that its resonance with the effective pole capacitance is sufficiently above both the switching and operating frequency of the M2LC subsystem 12. In doing so, the system control modules described hereinabove (or their functional equivalents) are capable of solving the low output frequency ripple voltage issue associated with other M2LC topologies and greatly simplifying and improving the ability of the M2LC subsystems 12 to balance voltage under all output operating conditions.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

What is claimed is:

1. A modular multilevel converter system, comprising:
    a plurality of series connected two-terminal M2LC subsystems arranged into at least two output phase modules, wherein a first one of the output phase modules defines a total value of inductance and comprises:
        a positive arm; and
        a negative arm; and
    a control system module communicably connected to the two-terminal M2LC subsystems of the first one of the output phase modules, wherein the control system module is configured to apply selectively reassigned modulated switch functions to only one of the following at a given instance of time:
        the two-terminal M2LC subsystems of the positive arm of the first one of the output phase modules; and
        the two-terminal M2LC subsystems of the negative arm of the first one of the output phase modules, wherein the selective reassigning of the modulated switch functions forces charge balance of the individual capacitors of the series connected two-terminal M2LC subsystems at a predetermined rate.

2. The modular multilevel converter system of claim 1, wherein the first one of the output phase module is configured so that a natural resonant frequency with the effective capacitance of the first one of the output phase modules is greater than the following:
    an operating frequency of the first one of the output phase modules; and
    a switching frequency of the first one of the output phase modules.

3. The modular multilevel converter system of claim 1, further comprising one or more inductors are connected between the positive and negative arms of the first one of the output phase modules.

4. The modular multilevel converter system of claim 1, further comprising one or more inductors distributed amongst the M2LC subsystems of the first one of the output phase modules.

5. The modular multilevel converter system of claim 4, wherein the one or more inductors are connected to output terminals of at least two of the M2LC subsystems of the first one of the output phase modules.

6. The modular multilevel converter system of claim 1, wherein the total value of inductance is the parasitic inductance of electrical circuits which comprise the output phase module.

7. The modular multilevel converter system of claim 1, wherein the control system module is further configured to control relative phase displacements of the selectively assigned modulated switch functions to the two-terminal M2LC subsystems of the first one of the output phase modules.

8. The modular multilevel converter system of claim 7, wherein the control system module is further configured to control the relative phase displacements in various degrees from two to n-levels, wherein the n-levels are determined by the number of operating two-level two-terminal M2LC subsystems in each arm of the first one of the output phase modules.

9. The modular multilevel converter system of claim 7, wherein the control system module is further configured to control the relative phase displacements by adjusting a value of a variable, wherein the value can be as low as zero and as high as one.

10. The modular multilevel converter system of claim 1, wherein the control system module comprises a pulse width modulator.

11. The modular multilevel converter system of claim 1, wherein the control system module comprises a time-averaged modulator.

12. The modular multilevel converter system of claim 1, wherein the control system module comprises a state-space modulator.

13. The modular multilevel converter system of claim 1, wherein the control system module is further configured to add reassigning "0" states to any of the two-terminal M2LC subsystems.

14. The modular multilevel converter system of claim 1, further comprising a plurality of bypass devices, wherein each bypass device is connected to a corresponding two-terminal M2LC subsystem.

15. The modular multilevel converter system of claim 14, wherein each of the bypass devices comprise two switching devices.

16. The modular multilevel converter system of claim 15, wherein the switching devices are insulated gate bipolar transistors.

17. The modular multilevel converter system of claim 15, wherein the switching devices have the same voltage rating as switching devices in the two-terminal M2LC subsystems.

18. The modular multilevel converter system of claim 15, wherein each of the bypass devices further comprises a resistor, wherein the resistor for a given bypass device is connected to:

a common connection of the two switching devices of the bypass device; and a common connection of two capacitors of the corresponding two-terminal M2LC subsystem.

19. A method for controlling a modular multilevel converter system, the modular multilevel converter system having a plurality of series connected two-terminal M2LC subsystems arranged into at least two output phase modules, the method comprising:

applying a first set of switch functions to M2LC subsystems of an arm of a first one of the output phase modules, wherein each M2LC subsystem of the arm receives a different one of the switch functions; and reassigning the switch functions until each of the switch functions have been applied to each of the M2LC subsystems of the arm.

20. The method of claim 19, wherein reassigning comprises rotating the switch functions until each of the switch functions have been applied to each of the M2LC subsystems of the arm.

21. The method of claim 19, further comprising:

applying a second set of switch functions to M2LC subsystems of another arm of the first one of the output phase modules, wherein each M2LC subsystem of the another arm receives a different one of the second set of switch functions; and reassigning the second set of switch functions until each of the second set of switch functions have been applied to each of the M2LC subsystems of the another arm.

22. The method of claim 21, wherein the first set of switch functions are applied at a different time than the second set of switch functions are applied.

* * * * *